United States Patent [19]

Stümpfi et al.

[11] Patent Number: 4,515,331

[45] Date of Patent: May 7, 1985

[54] HUB FOR MAGNETIC TAPE CASSETTES, ESPECIALLY COMPACT CASSETTES, AND MAGNETIC TAPE CASSETTE POSSESSING ONE OR MORE SUCH HUBS

[75] Inventors: Werner Stümpfi, Ludwigshafen; Günter Bettinger, Schifferstadt; Friedrich Engel, Frankenthal; Horst Fitterer, Mannheim; Norbert Kreimes, Ludwigshafen; Dietmar Pfefferkorn, Hemsbach; Norbert Schäffer, Diedesheim; Kurt Schmidts, Kehl, all of Fed. Rep. of Germany

[73] Assignee: BASF Aktiengesellschaft, Ludwigshafen, Fed. Rep. of Germany

[21] Appl. No.: 316,072

[22] Filed: Oct. 28, 1981

[30] Foreign Application Priority Data

Oct. 30, 1980 [DE] Fed. Rep. of Germany ... 8028933[U]
Feb. 19, 1981 [DE] Fed. Rep. of Germany ... 8104557[U]
Feb. 19, 1981 [DE] Fed. Rep. of Germany ... 8104556[U]

[51] Int. Cl.³ .............................................. G11B 23/04
[52] U.S. Cl. ................................................... 242/199
[58] Field of Search ............... 242/199, 197, 198, 200, 242/71.8, 68.5

[56] References Cited

U.S. PATENT DOCUMENTS

| | | | |
|---|---|---|---|
| 3,042,180 | 7/1962 | Bishop | 242/71.8 X |
| 3,512,734 | 5/1970 | Priest | 242/197 |
| 3,908,819 | 9/1975 | Gely | 242/71.8 X |
| 4,131,243 | 12/1978 | Machida | 242/199 |

FOREIGN PATENT DOCUMENTS

| | | |
|---|---|---|
| 1946536 | 9/1969 | Fed. Rep. of Germany . |
| 2056932 | 5/1971 | Fed. Rep. of Germany . |
| 7521898 | 4/1976 | Fed. Rep. of Germany . |
| 45516 | 6/1976 | Fed. Rep. of Germany . |
| 1593250 | 7/1981 | United Kingdom ............ 242/68.5 |

Primary Examiner—Stuart S. Levy
Assistant Examiner—Scott J. Haugland
Attorney, Agent, or Firm—Keil & Weinkauf

[57] ABSTRACT

The invention relates to a hub for magnetic tape cassettes, especially compact cassettes, and to magnetic tape cassettes possessing such hubs. In a first embodiment, spring means are provided on the inner periphery of the hub and exert radial pressures on the drive spindle, the spring means consisting, for example, of sprung teeth. In a further embodiment, the teeth have a spring rate of from about 1 P/mm to 40 P/mm. In another embodiment, the hub consists of an inner part and an outer part which can be coupled to one another and between which there is some play after coupling. A large number of specific examples of hubs are given to show possible shapes and arrangements of the teeth, and to show the types of material that can be used. In an advantageous embodiment, the inner part of the two-part hub can also be made a part of the drive spindle on the recorder, which inner part can be coupled with the outer part when the drive spindle enters the cassette.

12 Claims, 24 Drawing Figures

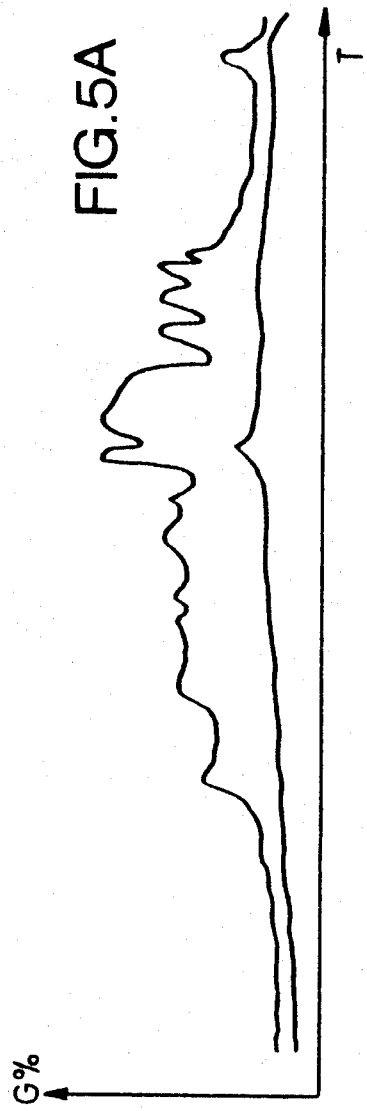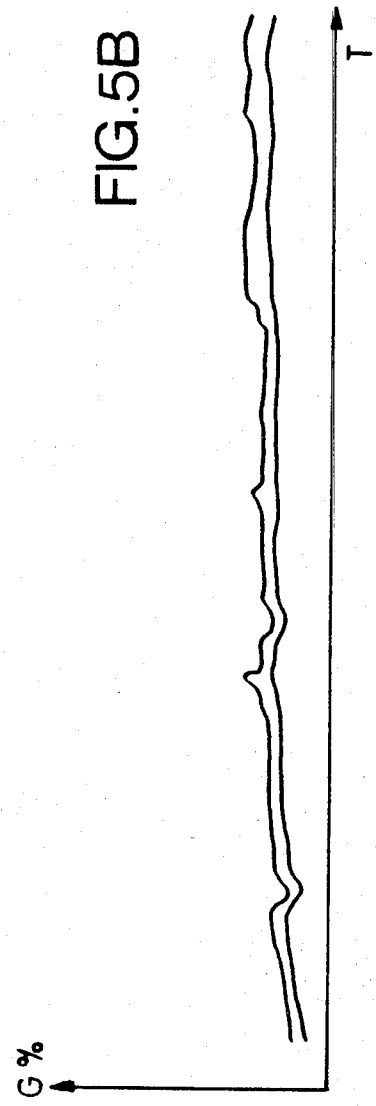

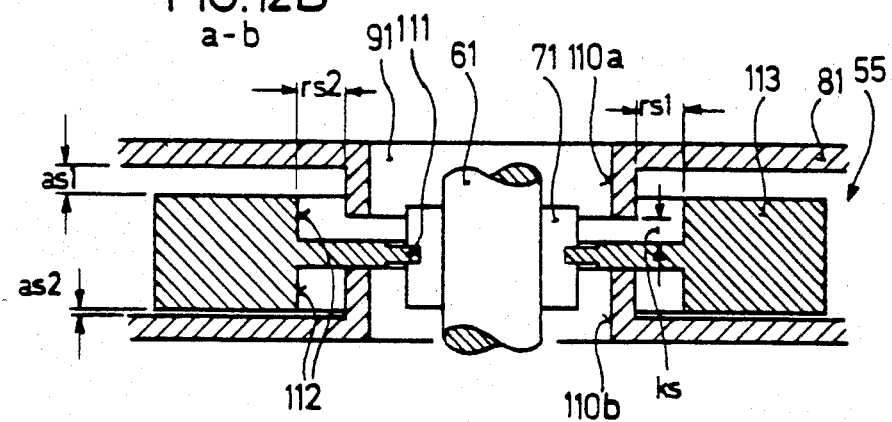
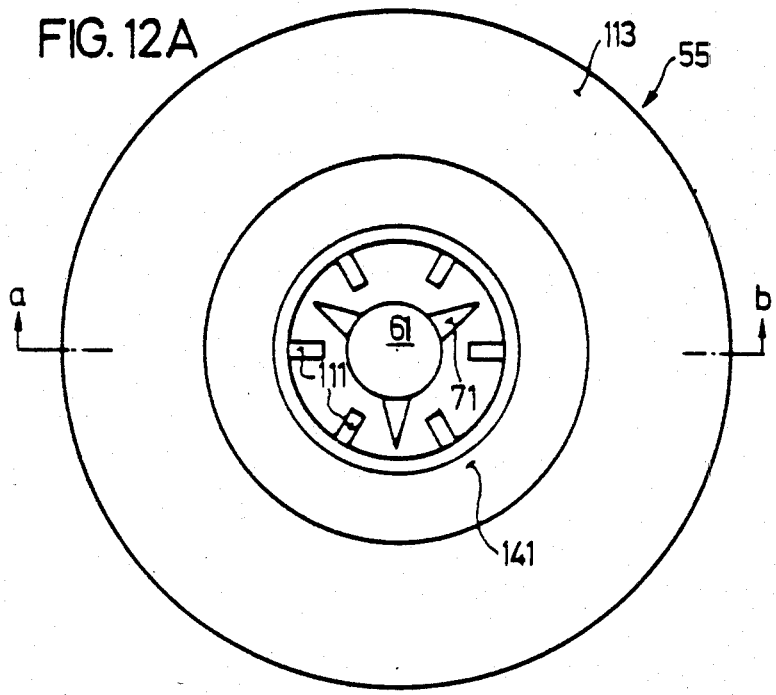

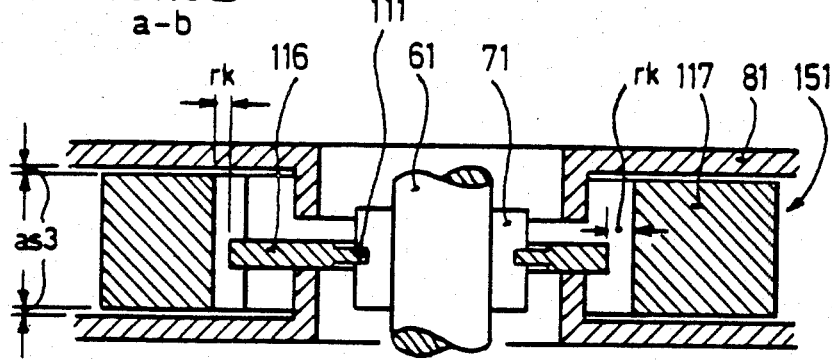
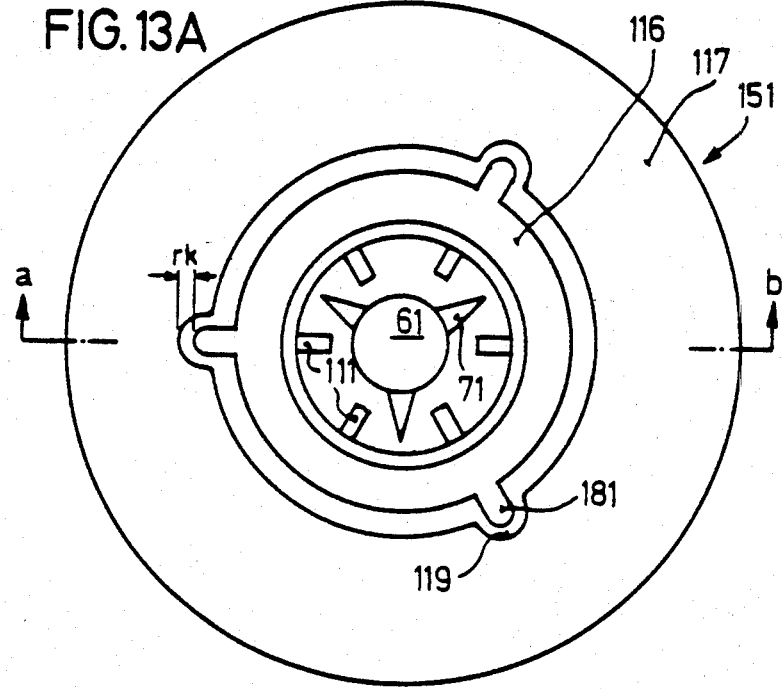

HUB FOR MAGNETIC TAPE CASSETTES, ESPECIALLY COMPACT CASSETTES, AND MAGNETIC TAPE CASSETTE POSSESSING ONE OR MORE SUCH HUBS

The present invention relates to a hub for magnetic tape cassettes, especially compact cassettes, comprising a ring member, on whose inner periphery teeth are provided for cooperation with the drive spindle, having projecting keys, of the recorder, and to a magnetic tape cassette having at least one such hub.

Though the distances between mutually opposite teeth on the hub of a cassette are standardized, excessive play between the teeth and the drive spindle is found, in particular due to the manufacturing tolerances of the recorder. In cassette recorders in which the cassettes are operated horizontally, but especially in recorders in which the cassettes are operated vertically, periodic, abrupt slipping of the reels in the cassette during recording and/or playback is observed, with perceptible fluctuations in pitch.

German Laid-Open Application DOS No. 1,946,536 has disclosed, for film cassettes, a film reverse drive—to make it possible to produce dissolving effects—in which a greater frictional torque is exerted than in the forward mode. In the conventional super-eight film cassette having one reel, the reel is provided, on the inner periphery with two sprung friction tabs which cooperate with the drive shaft to produce braking forces which differ from one another depending on the direction of transportation. The surface structure of the tab which in each case interacts with the drive shaft serves to create the differing braking forces.

In this known arrangement, not only is the drive shaft/reel drive connection completely different from magnetic tape twin-reel cassettes, but so also is the object to be achieved.

German Utility Model No. 75/21,898 discloses the use, for hubs in audio tape cassettes, of spring-loaded braking members which, when the cassette is taken out of the recorder, bear against the serving collars as bearings for the hubs, so that the hubs are locked and the formation of loops of tape inside the cassette is prevented. When the hubs are pushed onto the drive shafts of the recorder, the braking members are automatically released. These known hubs have a completely different purpose from that of the present invention.

Further, German Laid-Open Application DOS No. 2,056,932 discloses a tape cassette with tape rolls on hubs which are rotatable in ball bearings. In order to compensate for tolerances in the position and construction of the drive spindles, the inner part of the hub is made large relative to the spindle diameter, so that inclined positions of the spindle can be tolerated. The tolerances between the hubs and the cassette walls are made close, so that, in conjunction with complex tape guide means, contact of the tape roll surfaces with the cassette walls can be prevented. For compact cassettes, these measures are too expensive, since they are unsuitable for mass production.

In compact cassette systems, compatibility between the cassette and the recorder or, rather, its drive spindles is achieved by arranging for the hubs to have some play, in the radial and axial directions, relative to the cassette housing (FIG. 12). According to DIN 45,516, the following tolerances are provided:
play in the radial direction, min.: 1 mm, max.: 1.9 mm
play in the axial direction, max.: 1.3 mm.

Play in the radial direction of the hub, relative to the cassette housing, has the following disadvantages:

On fast rewinding, the hubs knock against the housing or bearing collars on the housing, especially on the supply side, and cause a distinctly audible rattling noise.

When the cassette is operated in a vertical position in the recorder, the hub runs so jerkily on the bearing collar on the supply side that rapid variations in tape tension result, which in turn lead to variations in pitch.

Play in the axial direction allows the hub and the tape roll —if there is also radial play—to assume an inclined position relative to the cassette bottom and top, i.e. to wobble. This can result in the tape being wound nonuniformly so that the tape roll has uneven lateral surfaces, as a result of which the frictional moment increases greatly, and the cassette frequently even freezes up. In addition, when operation of the cassette is suddenly started or stopped, the tape can slip off the roll and jam between the roll and the cassette housing.

It is an object of the present invention to eliminate the excessive play between the drive spindle and the hub by providing a new hub construction which can be manufactured easily and economically.

We have found that this object is achieved with a hub for magnetic tape cassettes, especially for compact cassettes, consisting of a ring member on whose inner periphery there are arranged teeth for cooperation with projecting keys on the drive spindle, wherein the inner periphery of the hub is provided with spring means which exert radial pressures on the drive spindle so as to reduce the play between the hub and the drive spindle.

The effectiveness of the spring means is independent of the direction of rotation of the drive spindle; the spring means also enable the hub and hence the entire tape roll to be centered relative to the axis of rotation. As a result, the aforementioned fluctuations in pitch, also referred to as wow, can be avoided.

It is a further object of the present invention to reduce the tolerances of hubs in the cassette housing, so that there is improved contact between the hub and the drive spindle, and the requisite play between the hub and the spindle is predominantly accounted for by the hub.

We have found that this object is achieved with a hub for magnetic tape cassettes, especially for compact cassettes, consisting of a ring member on whose inner periphery there are provided teeth for cooperation with projecting keys on the drive spindle, wherein the hub consists of not less than two parts, which can be coupled with one another and between which there is play after coupling.

Accordingly, the invention relates not only to the hubs themselves but also to the use of such hubs in cassettes, especially in compact cassettes, so that a tape cassette having such hubs itself also constitutes an advantageous embodiment of the present invention.

Some magnetic tape cassettes according to the invention are defined below:

A magnetic tape cassette, especially a compact cassette, having at least one hub consisting of a ring member, on whose inner periphery there are arranged teeth for cooperating with projecting keys on the drive spindle, conforms to the invention if the inner periphery of the hub is provided with spring means which exert radial pressures on the drive spindle so as to reduce the play between the hub and the spindle.

The above cassette can also be provided, on the inner periphery of the hub, with one or more movable teeth which exert radial pressure on the drive spindle of the recorder, so as to reduce the play between the hub and the spindle, the spring rate of the movable tooth or teeth being from about 1 P/mm to 40 P/mm.

A further advantageous magnetic tape cassette, especially a compact cassette, having at least one hub consisting of a ring member on whose inner periphery there are provided teeth for cooperation with projecting keys or the drive spindle of the recorder, there being only slight play between the inner walls of the cassette housing and the ring member, results if the hub consists of two parts, an inner part with teeth and an outer part, which parts can be coupled with one another for the transmission of torque, a predetermined play being provided between the inner part and the outer part.

"Play", in the present context, is to be understood in the broader sense as meaning that relative movement between the inner part and the outer part is possible. As a result, the outer part of the hub can be optimally matched to the cassette housing, and just enough axial and/or radial play between the hub and the housing can be obtained, the requisite play for bringing about compatibility between the cassette and the drive spindles of the recorder being obtained by the design of the inner part and the outer part of the hub, and by their relative arrangement.

Further feasible and advantageous embodiments of the hub according to the invention include the following:

The teeth on the hub can be sprung relative to the ring member, so that constant contact with the drive spindle is achieved.

Advantageously, immovable teeth alternate with sprung teeth; in particular, three of each are provided. The fixed teeth and sprung teeth are arranged symmetrically with respect to the axis of rotation of the hub, as a result of which good centering of the hub is attainable.

In principle, the sprung teeth according to the invention can be movable in the horizontal plane of the hub or in a direction at right angles to the hub. Which particular arrangement is preferred also depends on the drive spindle of the recorder.

In a preferred embodiment of the invention, the sprung teeth are arranged symmetrically with respect to the axis of rotation of the hub and there are not less than three such teeth.

In each case, the spring force, and the shape of the sprung teeth must be so chosen that insertion of the cassette into a recorder, and subsequent removal of the cassette, can be effected without difficulty, regardless of the particular shape of the drive spindles or of any possible axial play of the drive spindles.

In another advantageous practical embodiment at least one sprung tooth has a spring rate of from about 1 P/mm to 40 P/mm.

Independent movements of the hubs can be substantially avoided by means of a frictional connection which is adequately guaranteed by the above range of spring rates. At the same time, it is ensured that the hubs can easily be placed on, and coupled to, the drive spindles of the recorder, substantially independently of the particular dimensions of the spindles which, as experience shows, vary considerably between recorders from different manufacturers. In a further embodiment, the travel of an individual sprung tooth or the total travel of diametrically opposed sprung teeth is from about 0.6 to 0.8 millimeter. In practice, it is advantageous either to use four immovable and two sprung teeth or, conversely, four sprung and two immovable teeth.

Advantageously, the movable or sprung teeth have springs whose longitudinal axis is in the horizontal plane of the hub.

It can assist manufacture to have the hubs constructed of two or more parts, the immovable teeth being located on the rigid ring member and the movable teeth on a movable, in particular a sprung, part. This makes possible separate manufacture of the respective parts, and enables different materials to be used.

In a further embodiment of the invention, one or more movable teeth can be located on a part pivotable relative to the ring member, and there can be several such pivotable parts. This makes it possible, if the ring member is suitably cut away in the direction of rotation, to exert pressure on the drive spindle only when it rotates.

In an advantageous embodiment, two or more teeth can be provided on a common support spring-loaded against the ring member. This simplifies the manufacture of the individual parts of the hub.

In a further embodiment, essentially only radial play is present between the inner and outer parts of the hub. As a result, tolerances or inaccuracies of the drive spindles can be compensated.

In an advantageous embodiment, the inner and outer parts of the hub can be of different materials, with the inner part preferably being made of a resilient material and the outer part of a non-resilient material. This ensures that the inner part gives as the drive spindle enters or leaves it. It is even possible to fixedly mount such a resilient inner part on the drive spindle provided steps are taken to ensure that as the drive spindle enters the cassette the inner part comes into driving connection with the outer part of the hub, and comes out of engagement again when the cassette is removed.

Further, the inner part can be designed as a clamping member for the drive spindle, which improves power transmission when the spindles rotate, and prevents undesired independent movements of the hub relative to the drive spindle.

Further, it is possible to provide at least one spring element between the inner part and the outer part, this element providing a resilient mounting of the inner part relative to the outer part and thus determining the magnitude of play.

In this way, the inner part and outer part can be resiliently coupled together. Advantageously, the spring element consists of elastomeric foam or sheet material, so that it can be manufactured economically. Finally, it is possible to arrange a plurality of spring elements symmetrically with respect to the axis of rotation of the hub, or a single spring element asymmetrically, on the hub, whereby either centric or eccentric mounting of the hub on the drive spindle is achievable.

Furthermore, the inner part and the outer part can be provided, on the outer periphery and the inner periphery respectively, with projections and corresponding recesses, so as to ensure a secure connection between the inner part and outer part when the hubs rotate. Moreover, the inner part can be designed as a clamping member for the annular collar on the cassette.

Details of the invention are disclosed below with reference to the embodiments shown in the accompanying drawings, in which FIG. 1 shows a hub with three fixed teeth and three sprung teeth attached to said fixed teeth, FIG. 2 shows a hub with arcuate spring members for biassing the movable teeth;

FIG. 5A is a diagram of the fluctuations in tape speed produced by a conventional hub, as a function of time.

FIG. 5B is a diagram of the fluctuations in tape speed produced by hubs according to the invention, as a function of time.

Figure 6:
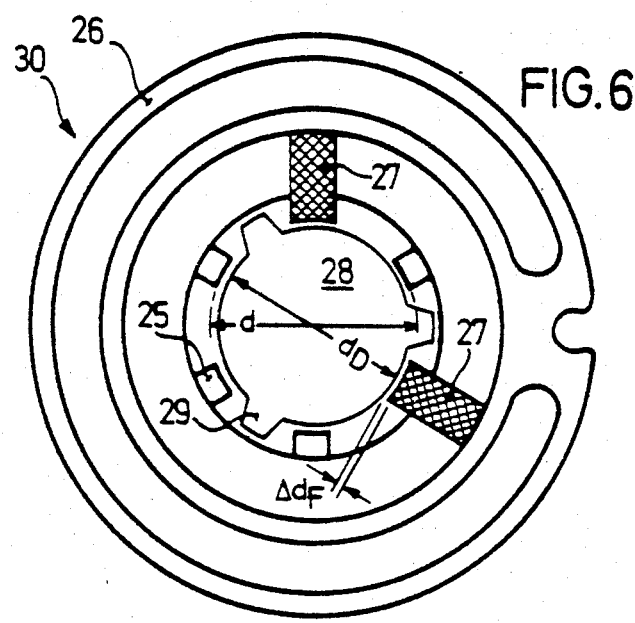
Figure 6A:
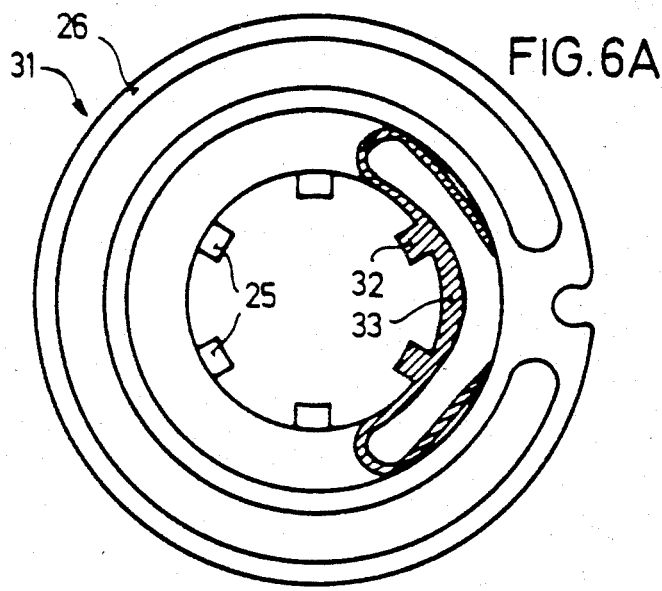
Figure 7:
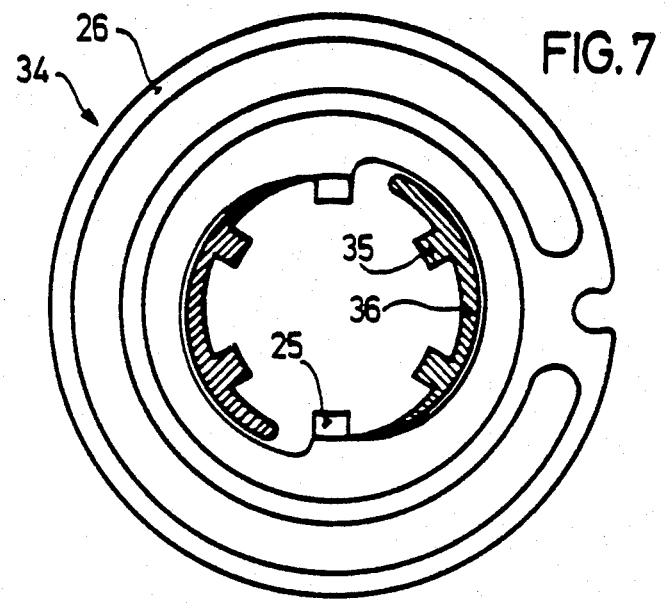
Figure 8:
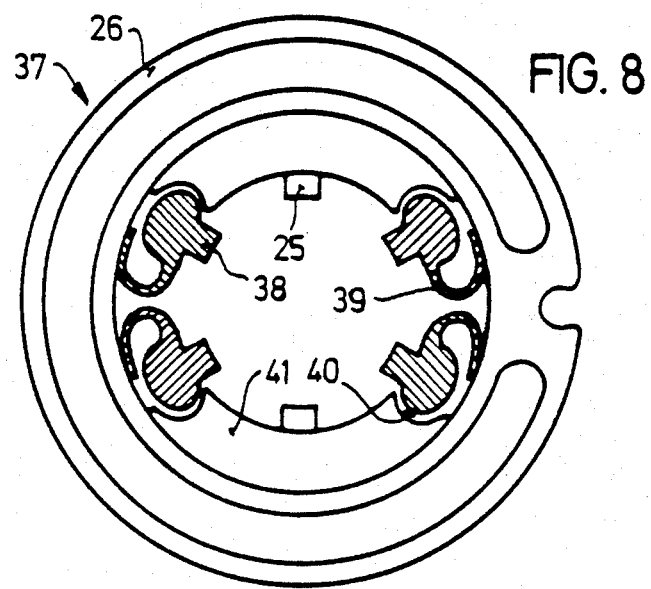
Figure 9:
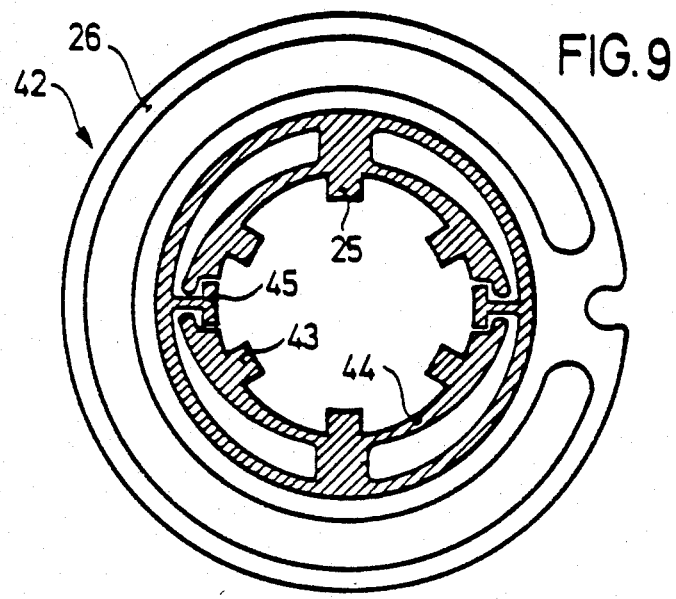
Figure 10:
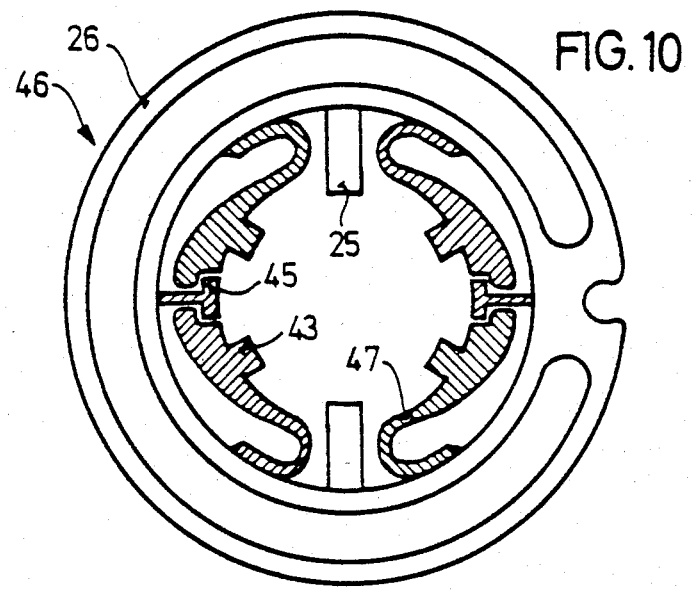
Figure 11:
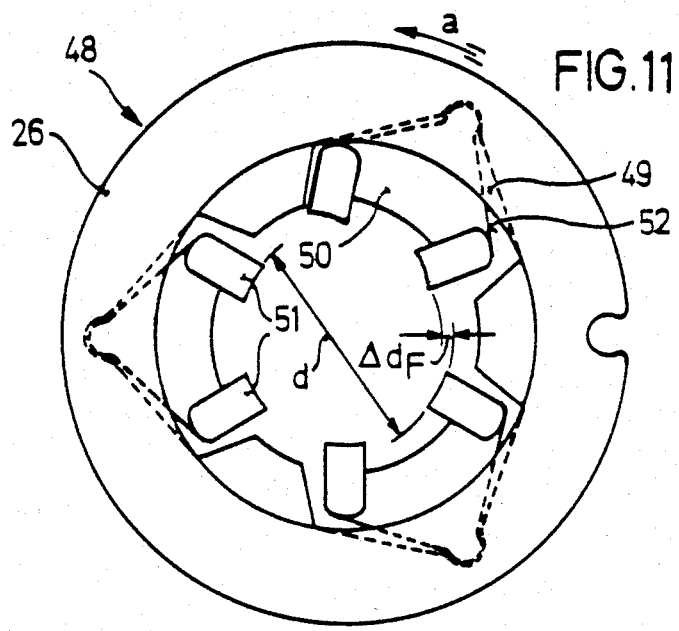
Figure 14:
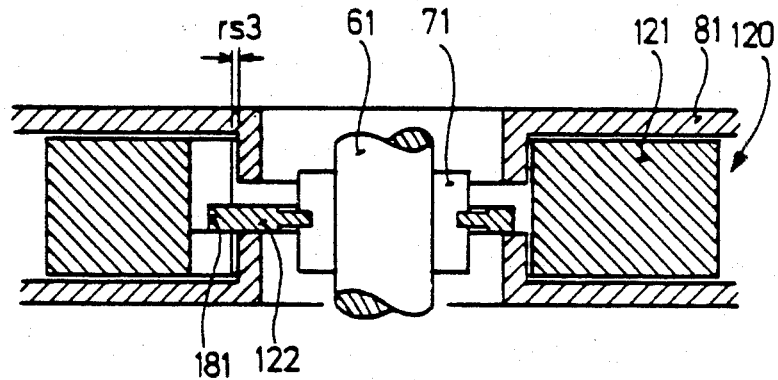
Figure 16:
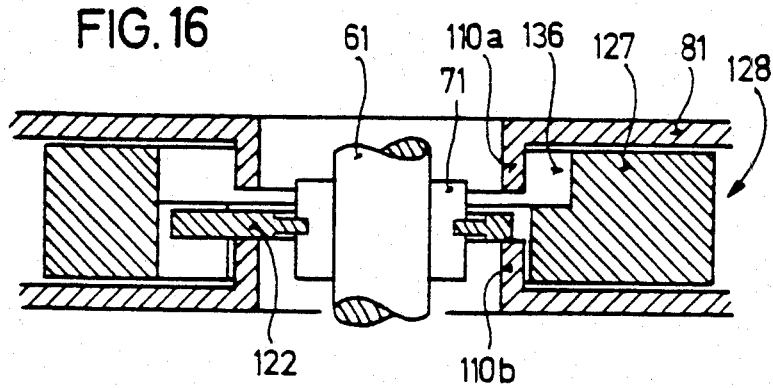
Figure 15B:
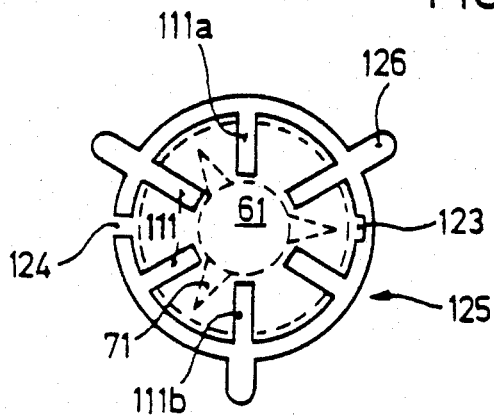
Figure 15A:
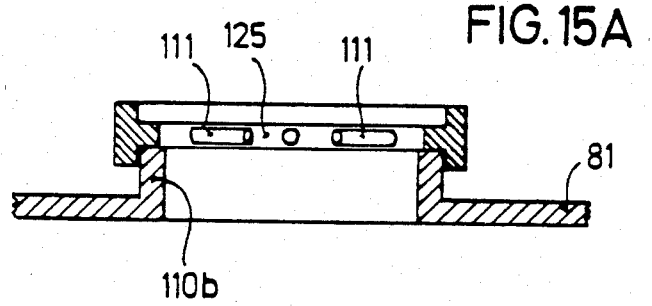
Figure 18:
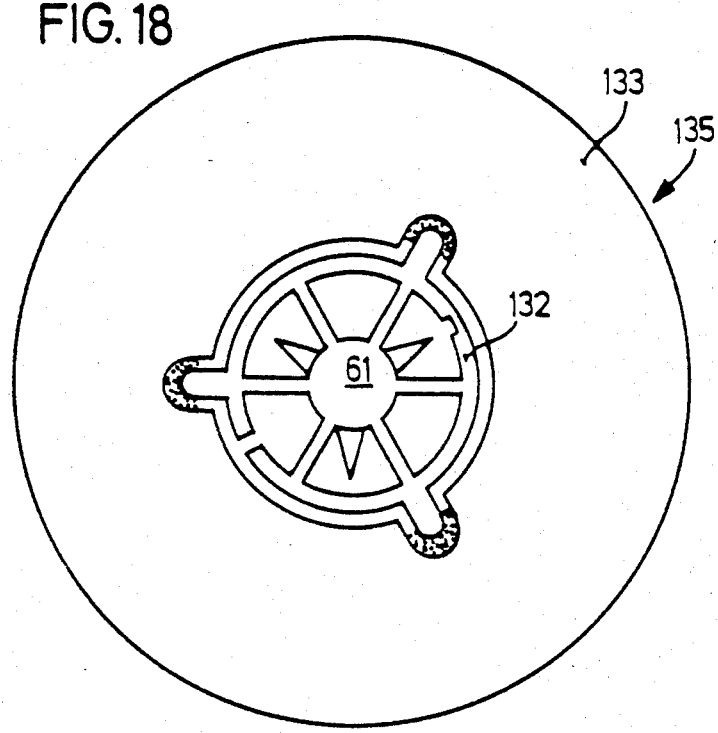
Figure 17A:
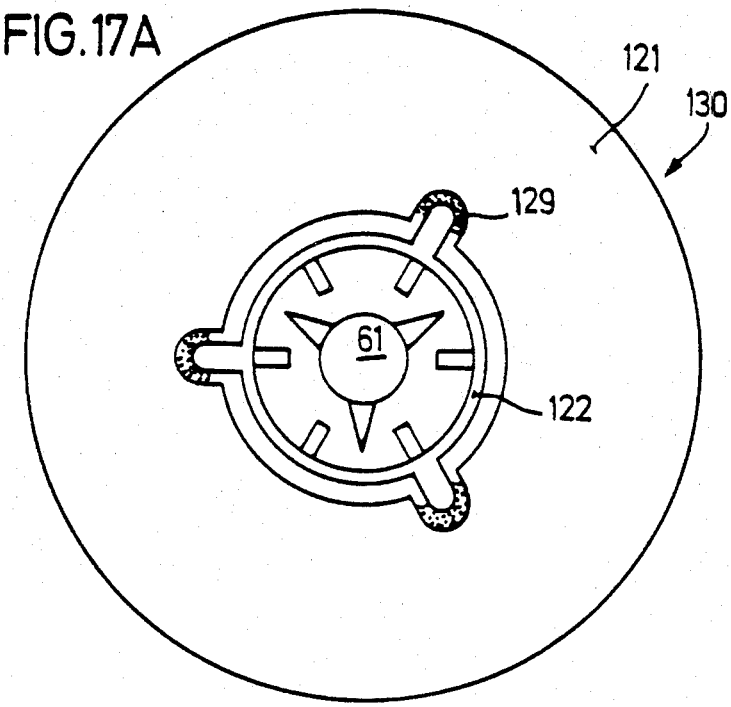
Figure 17B:
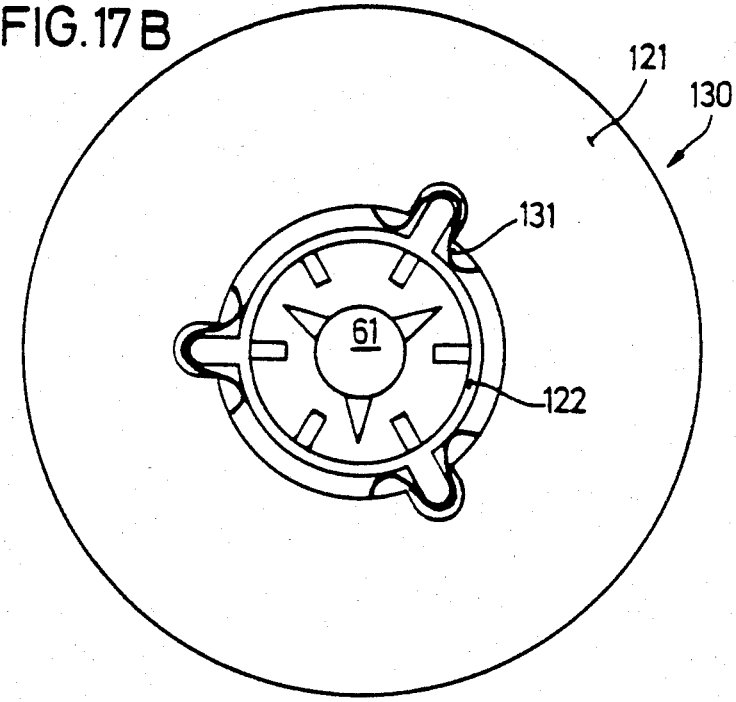

FIG. 6 shows a hub according to the invention, with asymmetrically arranged movable teeth, FIG. 6A shows a hub provided, at one side of the inner periphery, with two teeth on a sprung support, FIG. 7 shows a hub with two symmetrically arranged spring support, each having two teeth, FIG. 8 shows a hub with four movable teeth, each attached to the ring member via a leaf spring, FIG. 9 shows a hub with two fixed teeth each having two sprung teeth integral therewith, FIG. 10 shows a variant of the hub of FIG. 8, with four movable teeth, each fastened to the ring member via a leaf spring, FIG. 11 shows a hub with movable teeth arranged on pivotally mounted members, FIGS. 12A and 12B show a conventional one-part hub in a cassette housing, with the drive spindle in engagement with the hub, A being a plan view with the cassette top removed, and B a section taken along line a-b, FIGS. 13A and 13B show a two-part hub according to the invention with the drive spindle in engagement with the hub, A being a plan view with the cassette top removed, and B a section taken along line a-b, FIG. 14 shows a hub according to FIG. 13B, but with slight radial play, FIG. 15B shows a slit inner part of a two-part hub, in plan view, FIG. 15A shows a view, in section, of the inner part, in the lower part of the housing of the cassette, FIG. 16 shows a two-part hub with an outer part asymmetrical to the horizontal plane, FIGS. 17A and 17B show two-part hubs with springy inserts between the inner part and the outer part, and FIG. 18 shows a two-part hub, the inner part being integral with the drive spindle.

Figure 1:
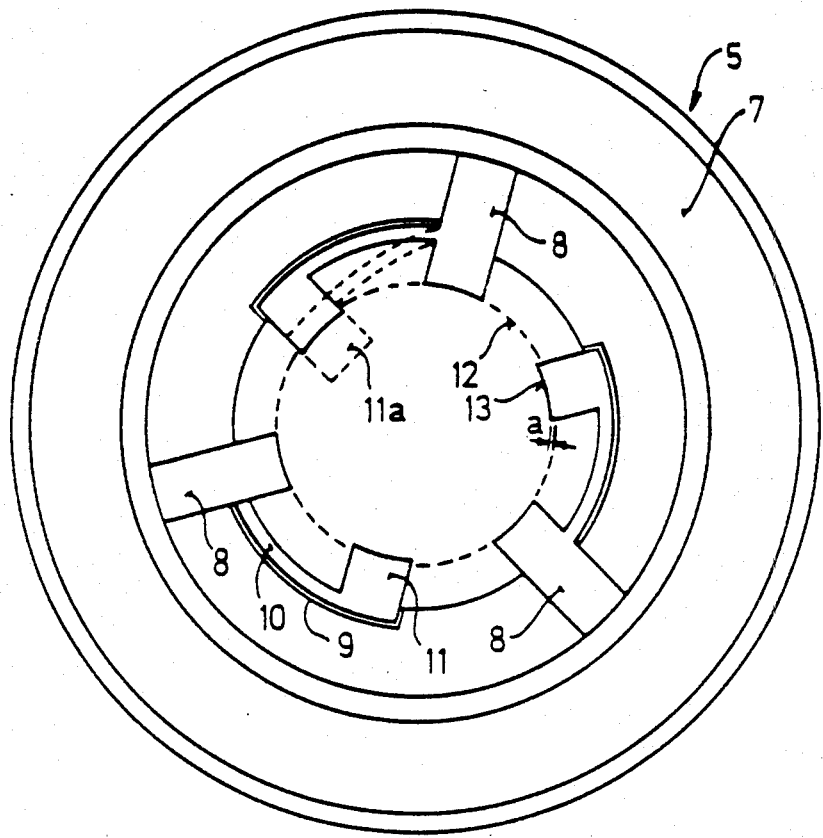

FIG. 1 shows an annular hub 5, basically as used in compact cassettes. Additionally, spring means are provided so that three of the six teeth normally present are spring-mounted with respect to the ring member 7. In a conventional hub, all the teeth are integral with the ring member 7 like the fixed teeth 8 in the Figure. In this special embodiment of the hub, a part of the inner periphery of the ring member 8 is undercut to form an arcuate groove 9, so that a springy member 10 bearing tooth 11 is formed, the said tooth 11 thus being movable in the radial direction, as indicated in broken lines at 11a. The circle 12 described by the ends of the fixed teeth when the hub rotates is also shown in the drawing; the end 13 of the sprung tooth 11 projects beyond this circle by a small distance a. Normally this distance is a few tenths of a millimeter. However, suitable dimensions can be selected for each particular case. The arrangement of all the teeth 8 and 11 is symmetrical with respect to the axis of rotation of the ring member 7, so that, in addition to a reduction in play relative to the drive spindle (not shown) of the recorder, a centering action on the hub and hence on the entire tape reel is achieved. The sprung teeth of the hub may be of any size in the axial direction, an upper limit being imposed by the spacing between the bearing collars on the cassette. The dimensions also depend on the material used, because adequate contact between the sprung teeth and the drive spindle must be ensured, to allow the transmission of forces of a sufficient magnitude which reliably hold the tape reel in an essentially central position.

Figure 2:
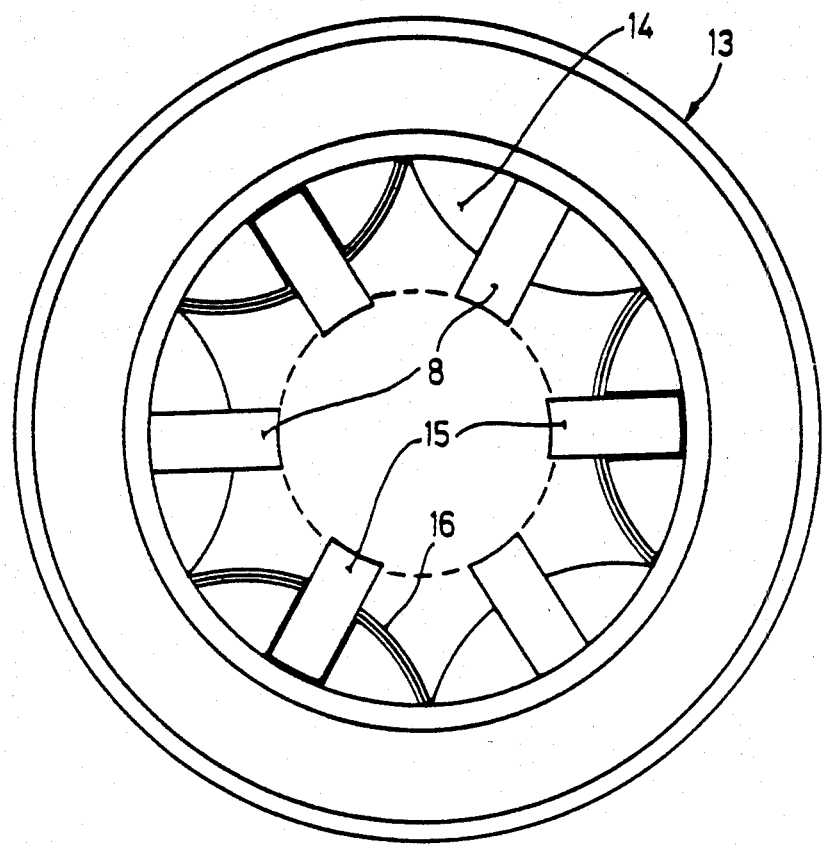

FIG. 2 shows a hub 12 whose inner peripheral surface is provided with segment-shaped projections 14 which accommodate the fixed teeth 8 and sprung teeth 15. The sprung teeth 15 are fastened to the center of arcuate springs 16. It is also conceivable to use these arcuate springs 16 without the projections 14.

Figure 3:
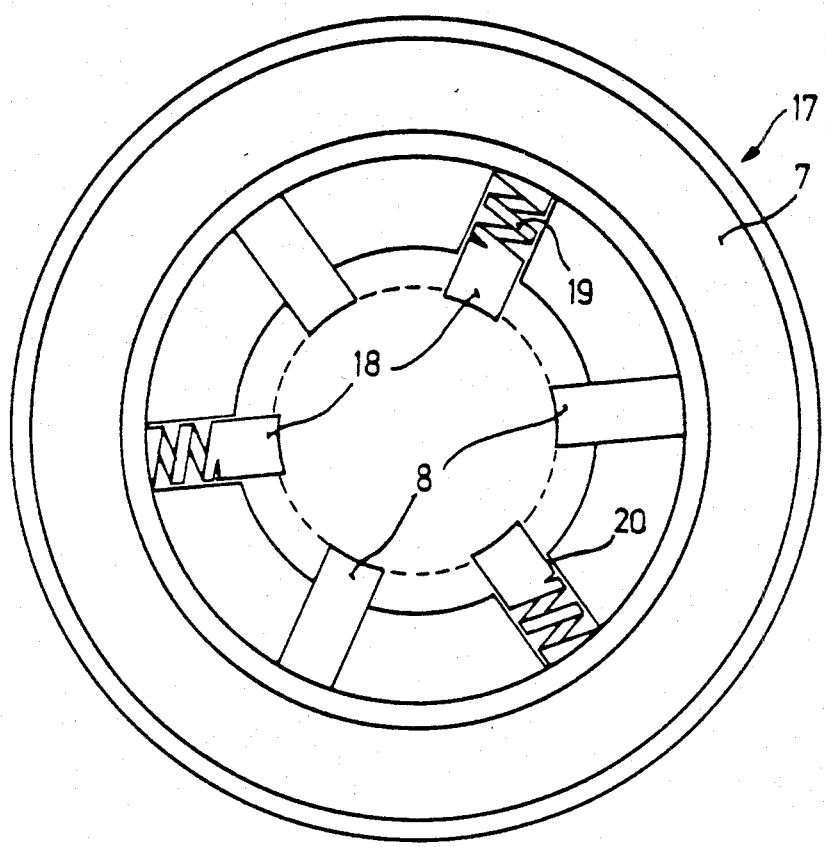
FIG. 3 shows a hub with coil-spring-loaded teeth.

FIG. 3 shows a further hub 17 with fixed teeth 8 and sprung teeth 18, the teeth 18 being spring-loaded against the inner periphery of the ring member 7 by means of coil springs 19, grooves 20 serving to guide the radial movements of the sprung teeth 18.

Figure 4:
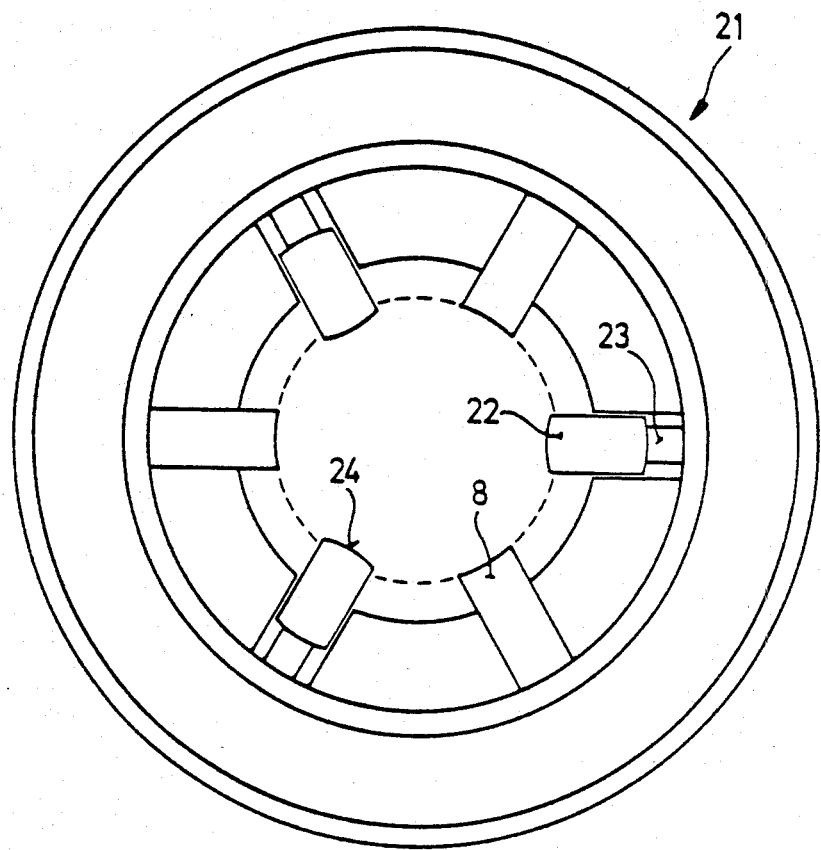
FIG. 4 shows a hub with leaf-spring-loaded teeth.

In a further embodiment (FIG. 4), a hub 21 having fixed teeth 8 and sprung teeth 22 is provided with horizontal flat leaf springs 23 which allow the sprung teeth 22 also to move axially, which happens when the hub is placed on, and removed from, the drive spindle of the recorder. The spring force comes into effect as a result of the sprung teeth 22 being deflected from the horizontal plane of symmetry. The front end 24 of the sprung teeth 22 can have a domed shape, and this is also true in all the other embodiments.

The hubs are advantageously manufactured in one piece from a suitable plastic material by injection-molding. Of course, other processes, for example compression-molding, can also be employed.

The force of the spring elements of the sprung teeth must be so adjusted that the hub is held frictionally on the drive spindle. In principle, the number of sprung teeth can be chosen at will. It is advantageous to have a sequence of alternating fixed teeth and sprung teeth, but an asymmetrical arrangement also has the above advantages of fixing the hub. In principle it is of course also possible to have, in addition to fixed teeth, spring members of any suitable shape on the ring member, without these spring members also having to be tooth-shaped.

FIG. 5A is the envelope of the measurements obtained with a cassette having conventional hubs in which all the teeth are fixed. FIG. 5B shows a similar envelope for a cassette with hubs according to FIG. 1. The average wow G was about three times as great in the case of a cassette not employing the hubs according to the invention.

As can also be seen from a comparison of envelopes 5A and 5B, FIG. 5B essentially shows the wow attributable to the recorder, whilst FIG. 5A essentially shows the wow attributable to the cassette. This latter wow is evidently caused by the additional independent movements of the hubs relative to the drive spindles (i.e. by out-of-true running) and is virtually completely eliminated by the invention.

The test apparatus and conditions were as follows:
Cassette recorder suitable for vertical operation: Sharp Optonica RT 3838
Graphic recorder: Brüel and Kjaer level recorder, Model No. 2305, writing speed 63 mm/sec;
Wow and flutter meter: Woelke ME 105 (frequency at which measurements were made: 3150 Hz (according to IEC (94), weighting filter switched off); and
The distance a (cf. FIG. 1)=about 0.15 mm.

FIG. 6 shows a hub, essentially of the conventional type, with four fixed teeth 25. The fixed teeth 25 are rigidly attached to the ring member 26 since the hub is a one-piece plastic injection molding. Opposite two of the fixed teeth 25 in the positions normally occupied by fixed teeth in the case of a conventional hub, there are provided sprung teeth, so that the arrangement of the sprung teeth 27 is unsymmetrical relative to the horizontal center line. A drive spindle 28 is shown in engagement with the hub 30, the projections 29 on the spindle fitting into the spaces between the teeth 25 and 27. The diameter of the drive spindle 28 is marked $d_D$ and the diameter of the circle on which the end faces of the fixed teeth 25 lie is marked d. The sprung teeth 27 project beyond the circle of diameter d by a distance $\Delta d_F$ which is from about 0.3 to 0.4 mm when using approximately diametrically opposed sprung teeth 27. If only a single sprung tooth 27 is used, the distance has to be doubled. Asymmetrical arrangements require a distance between 0.3-0.8 mm.

Basically, the distance referred to is determined by the different diameters of the drive spindles of the recorders. A comparison of 17 different recorders showed a difference between $d_D$ min=7.35 mm and $d_D$ max=7.65 mm of 0.3 mm. Since the DIN Standard specifies a diameter d of 7.8-8.0 mm for hubs, the play s which has to be compensated according to the invention is —taking the minimum diameter $d_D$ of the drive spindle to be 7.35 mm—from 0.45 to 0.65 mm. With the additional requirement, according to the invention, that the spring force applied by the sprung teeth should effectively act on the recorder drive spindle, and taking an average minimum spring travel of 0.15 mm, the total spring travel $\Delta d_F$ is 0.6-0.8 mm.

Some further embodiments of hubs are described below.

In FIG. 6, the spring force can also be applied by sprung teeth 27 made of a resilient, for example elastomeric or plastic foam, material and fixing them to the ring member 26 in a suitable manner, for example by gluing.

At the ends at which they are fixed, the sprung teeth 27 can also be provided with plastic leaf springs or coil springs, provided that a substantially radial spring action is desired.

FIG. 6A shows a hub 31, again with four fixed teeth 25 and two sprung teeth 32, but with the latter located on a flexible, bow-shaped support 33. The support 33 can be closed or open at the rear, and is advantageously fixed, at the rear, to the ring member 26. This again results in a one-sided, unsymmetrical spring loading on the drive spindle 28. FIG. 6A shows a first embodiment of a two-part hub which, according to the invention, is of particular importance. Thus, the annular part 26 carrying the fixed teeth 25 can be produced in one piece from a rigid plastic, and the support 33 with the sprung teeth 32 can be produced in one piece from a soft, resilient plastic, after which the two parts can be suitably joined, for example by a push-fit or snap-fit connection or by gluing, ultrasonic welding, etc.

The spring rate of each sprung peg should be from about 1 P/mm to about 40 P/mm (from 0.3 cN/0.3 mm to about 12 cN/0.3 mm), cN (Centinewton) being a hundredth of a Newton and P being a Pond. This spring rate is attainable with numerous plastics which are inherently springy or springy by virtue of the particular shape, for example with almost all rubber or elastomeric materials, but also with thin flexible rigid plastics such as nylon, polypropylene and the like.

FIG. 7 shows a hub 34 with two diametrically opposed fixed teeth 25 and four sprung teeth 35 arranged symmetrically with respect to the axis of rotation of the hub 34, pairs of sprung teeth being located on a common flexible support 36 which is fixed to the ring member at one end only. Since the support 36 increases in thickness and is fixed at one end only, approximately the same spring force can be applied by each of the sprung teeth.

FIG. 8 shows a further embodiment in which hub 37 is provided with two diametrically opposed fixed teeth 25 and four symmetrically arranged sprung teeth 38. These teeth 38 are spring-loaded against the ring member 26 by means of individual springs 39. These springs 39 can be thin, curved plastic elements which are integral with the teeth 38. The smaller the radius of the plastic springs, the less the effective spring force is. The sprung teeth 38 are bent toward the hub center. Recesses 40 on the inner part of the ring member 26 serve to limit the travel of the sprung teeth. The teeth 38 can also be fastened separately to springs 39. In an advantageous variant, an inner member 41 bearing the fixed teeth 25 and sprung teeth 38 is produced separately, and this member is then fastened to the inside of the ring member 26.

FIG. 9 shows a hub 42 with two diametrically opposed fixed teeth 25, to each of which two sprung teeth 43 are attached, or molded, via spring elements 44. The inwardly curved spring elements 44 provide the spring force applied by the teeth 43. Fixed stops 45 limit the spring travel.

FIG. 10 shows, as a variant of the hub of FIG. 8, a hub 46 in which leaf spring elements 47, bent back on themselves, and resembling those of FIGS. 6A and 8, are used. Corresponding parts carry the same reference numerals. In this embodiment and in the embodiment shown in FIG. 9, the hubs 42 and 46 can be manufactured in two or three parts, which is regarded as advantageous.

FIG. 11 shows a hub 48 with a ring member 26, approximately triangular cut-outs in the said ring member and triangular parts 50 pivotally mounted in the cut-outs 49. The cut-outs 49 are larger, in the circumferential direction, than the pivoting parts 50. Two teeth 51 are provided on each pivoting part 50. One of the pivoting parts 50 is shown in the deflected position resulting from rotation in the direction of the arrow a. The front sloping edge of the pivoting part 50 comes into contact with the front wall of the cut-out, whilst the rear sloping edge 52 lifts off from the rear sloping edge of the cut-out. As a result of this pivoting, the rear tooth 51 (viewed in the direction of the arrow a) projects beyond the circle of diameter d by an amount $\Delta d_F$ and thus reduces the play relative to the drive spindle (not shown), whilst exerting a compressive force which depends on the speed of rotation. The cut-out 49 and the pivoting part 50 are both of symmetrical shape, so that a reduction in play results on rotation in either direction.

The pivoting parts 50 can be push-fit in the ring member 26. As a result of the symmetrical arrangement of the three pivoting parts of identical shape, the hub 48 is also centered relative to the drive spindle. In principle, other shapes of the pivoting parts and of the corresponding cut-outs are also conceivable. Thus, for example, two pivoting parts arranged diametrically opposite one another also suffice to achieve centering.

Measurements carried out under conditions encountered in practice have shown that the play between the hub and the drive spindle is greatly reduced.

The results below were obtained on a Pioneer GT 700 cassette recorder, in vertical operation:

| Hub play (mm) | Wow (%) |
| --- | --- |
| 0.5 | 0.65 |
| 0.2 | 0.40 |
| 0.08 | 0.28 |
| 0 | 0.26 |

A comparison of the results shows that reducing the play, according to the invention, from 0.5 mm to 0.08 mm more than halves the wow.

FIGS. 12A and 12B show views of a conventional hub 55, used in compact cassettes, in conjunction with a recorder drive spindle 61, having projecting ribs 71, in engagement with the hub. The cassette housing 81 is shown in diagonal section through one of the orifices 91, this orifice being defined by an annular collar 110a, 110b which projects symmetrically with respect to the horizontal central plane of the housing into the interior of the housing. The hub 55 is made in one piece, in general from a plastic, and has, on its inner periphery, teeth 111 which mesh with the projecting ribs 71 of the drive spindle 61 for rotation of the hub. The size of the circular cut-outs 112 determines the radial play $rs = rs1 + rs2$ of the hub 52 relative to the annular collar 110a, 110b. The axial play as is the sum of the component axial plays as1 and as2. Depending on their relative magnitudes, the axial play of the ring member 113 can additionally be determined by the axial play ks of the hub 55 between the opposite annular collars 110a and 110b.

As mentioned in the introduction, the amounts of the individual plays are as follows:

$1 \text{ mm} \leq rs \leq 1.9 \text{ mm}$ and $as \geq 1.3 \text{ mm}$.

The middle part 141 of the hub 55, which also carries the teeth 111 (of which there are six in the example shown), rests on the lower annular collar 110b. As a result, the axial plays as1 and as2 are unequal. In the ideal case, the hub 55, in operation on the recorder, is located precisely in the middle of the housing 81, so that as1 = as2.

FIGS. 13A and 13B show a first embodiment of a hub 151 according to the invention, corresponding parts carrying the same reference numerals as in FIG. 12. The hub 15 consists of the inner part 116 and the outer part 117, the inner part 116 being of a shape roughly corresponding to that of the middle part 141 of the hub 55, and the shape of the outer part 117 roughly corresponding to that of the ring member 113. The inner part 116 and outer part 117 are connected or coupled to one another, or capable of being connected or coupled to one another, by suitable means, in such a way that the torque produced by the drive spindle 61 engaging the inner part 116 is transmitted to the outer part 117. As shown in FIG. 13A, the inner part 116 has, on its outer periphery, several—for example three—projections 181, which engage recesses 119 on the inner periphery of the outer part 117. The coupling between the inner part 116 and outer part 117 can however also be achieved in any other suitable manner. FIG. 13B shows that the radial play rk between the inner part 116 and outer part 117 is special to this design, whilst the radial play rs is the same as in FIG. 12. However, the axial play as3 of the outer part 117 relative to the housing 81 is substantially less, as a result of which the advantages, mentioned above, of better and more accurate rotation of the reel are attainable. As a result of the special radial play rk, tolerances attributable to the recorder and/or the cassette, or mechanical deficiencies of the recorder, for example skewing of the drive spindle, incorrect location of the drive spindle, and variations in diameter of drive spindles, can advantageously be compensated. In the axial direction, the inner part 116 and outer part 117 are movable relative to one another to any desired extent, as long as the plays are as in FIG. 13 and as long as there are no resilient members between the inner part 116 and outer part 117. The axial mobility of the inner part 116 relative to the outer part 117 is restricted, in the embodiment shown, to the distance ks (cf. FIG. 12B) between the annular collars 110a and 110b.

FIG. 14 shows a hub 120 wherein the play between the outer part 121 and the annular collars 110a and 110b, i.e. in the radial direction, is much less than in the case of the outer part 117 in FIG. 13. This reduced radial play rs3 has the advantage of even better centering and accordingly of truer rotation of the hub 120 and thus also of the tape roll (not shown in the drawing). The inner part 122 corresponds to the part 116 in FIG. 13, with a slightly smaller diameter. FIG. 15B shows an inner part 125 whose outer and inner diameters can be varied in accordance with the particular width of the cut-out 124. A groove 123 can be provided diametrically opposite the cut-out 124, if the material of the inner part 125 is not inherently flexible enough. If the projections 126 are of appropriate size, it is possible to clamp the inner part 125 over the annular collar 110b (cf. FIG. 15A) so that only when the drive spindle 61 enters the inner part 125 is it released from the annular collar 110b, brought into the central position in the cassette housing, and there coupled to the corresponding outer part, not shown in the drawing. In any case, the projections 126 should be of such a size relative to the recesses in the outer part that for any diameter of the inner part 125 the outer part of the hub is satisfactorily driven by the inner part.

With this type of flexible inner part 125, it is particularly easy to compensate diameter variations of drive spindles, so as to achieve optimal centering. A series of measurements carried out on 17 different cassette recorders showed that the drive spindles varied in diameter from 7.35 mm to 8.0 mm. It is, furthermore, also possible to employ teeth 111 of different length; for example, teeth 111a and 111b are at a distance from one another corresponding to the minimum diameter of 7.35 mm, whilst the other teeth 111 are at a distance from one another corresponding to the maximum diameter of 8.0 mm, or vice versa. It is however advisable that any two diametrically opposed should be of equal length.

FIG. 16 shows an unsymmetrical hub 128, in contrast to the hubs hitherto described which are symmetrical with respect to the central plane of the cassette. The difference is to be seen essentially in the outer part 127, which, compared to the outer part 121 in FIG. 14, has a cut-out 136, corresponding to the cut-out bearing reference numeral 112 in FIG. 12B, but in the present embodiment only associated with the upper annular collar 110a. There is only slight play between the lower half of the outer part 127 and the annular collar 110b, as in the case of the outer part 121 in FIG. 14. This design has the advantage that the hub 128 is oriented only relative to one half of the housing, in the present case the lower part carrying the annular collar 110b; otherwise, the tolerances of the upper and lower parts of the housing have to be taken into consideration in deciding the size of the hub.

FIG. 17A shows a hub 130 consisting of an inner part 122 and an outer part 121, as in FIG. 13A, but here pieces of a resilient material, for example an elastomeric foam, are provided in the gaps between the projections 181 and the recesses 119. If three identical pieces of foam, 129, are used, automatic centering of the inner part 122 is achieved. If only one piece 129 is used, or if pieces having different resilience are used, it is possible to achieve a deliberate decentering of the inner part 122, so that, for example, one or two of the ribs 71 on the drive spindle 61 come into contact with the teeth 111. FIG. 17B shows the same hub 130, but with pieces of springy sheeting 131 instead of the foam pieces 129.

In both cases, a resilient coupling between the inner part 122 and outer part 121 is desired, and the spring elements 129 and 131 are made from appropriate materials and with appropriate dimensions.

FIG. 18 shows, as a further variant, a hub 135. As can be discerned in the Figure, an inner part, essentially corresponding to the inner part 125 in FIG. 15, is fixed on the drive spindle 61. The drive spindle/inner part assembly 132 thus enters the cassette orifice 91 as an entity and comes into engagement with the outer part 133, located in the cassette housing 81; this outer part 133 essentially corresponds to the outer parts 117 and 121 and can, if necessary, have resilient pieces of foam or sheeting, 129 or 131.

The coupling between a drive spindle/inner part assembly and an outer part in the cassette can be effected in any appropriate manner which has the end result that the drive torque is transmitted substantially without slip to the outer part and accordingly to the tape reel. Thus, for example, the inner and outer parts may be conical and may be provided with an appropriate material which assists grip, but also permits easy separation of the parts.

Through appropriate choice of the material of the inner part and the outer part, with or without an intermediate part, it is possible to obtain the desired coupling forces between the inner part and outer part when the hubs are rotated. However, the outer part should be sufficiently rigid to ensure that it can properly perform its function of carrying the tape roll. Resilient materials can be used for the inner part, provided the torque is nevertheless transmitted to the outer part essentially without loss. Care must be taken to ensure that the tolerances rs and as of the outer part relative to the cassette housing are not made too small as a result of the use of resilient materials for the inner part of the intermediate part.

As regards the order of magnitude of the radial play and the axial play of the outer part relative to the housing, values of the order of $0.1 \text{ mm} \leq rs$, and $as \leq 0.2 \text{ mm}$, are feasible in practice.

In practice, the play rk between the inner part and outer part of the hub is of the same order of magnitude as rs (see above).

In tests carried out under field operating conditions, it was found that both the mechanical and the electro-acoustic properties of commercial compact cassettes were substantially improved by fitting the cassettes with hubs designed according to the invention. By making the inner part a component of the recorder, i.e. by providing the drive spindle with the part cooperating with the hub (outer part) in the cassette, it is possible to reduce the cost of the cassette and improve the transmission of torque from the drive spindle to the hub.

A resilient coupling between the inner part and outer part can be achieved by, for example, using an elastomeric adhesive.

In the last few embodiments mentioned, the requisite play is advantageously provided, according to the invention, between the inner part and outer part of the hub, so that very small play between the outer part and the cassette housing is achieved without there being any need to modify the housing.

We claim:

1. A hub for magnetic tape cassettes, especially for compact cassettes, for use with a transport apparatus having a drive spindle provided with projecting keys, said hub being displaceable in said cassette in at least the radial direction, and comprising a ring member on whose inner periphery there are arranged teeth for driving engagement by said projecting keys on the drive spindle, wherein said teeth include, in circumferentially spaced relation, a plurality of immovable teeth which are radially spaced from the spindle, and also, in the same plane with said immovable teeth, at least one movable tooth which is spring-biased against the ring member to exert radial pressure on the drive spindle, so as to resiliently couple said hub to said spindle and thereby counteract abrupt displacements of the hub relatively to the cassette and hence reduce corresponding fluctuations in pitch during the operation of the cassette.

2. A hub as claimed in claim 1, wherein said at least one spring-biased tooth has a spring rate of from about 1 P/mm to 40 P/mm.

3. A hub as claimed in claim 1, wherein immovable teeth alternate with spring-biased teeth.

4. A hub as claimed in claim 1, wherein four immovable teeth and two spring-biased teeth are provided.

5. A hub as claimed in claim 1, wherein two immovable teeth and four movable spring-biased teeth are provided.

6. A hub as claimed in claim 1, wherein the spring-biased tooth possesses a spring which is effective in the horizontal plane of the hub.

7. A hub as claimed in claim 1, wherein the spring-biased tooth possesses a spring which is effective in the axial direction of the hub.

8. A hub as claimed in claim 1, wherein the spring-biased teeth are arranged symmetrically with respect to the axis of rotation of the hub and there are not less than three such teeth.

9. A hub as claimed in claim 1, wherein the travel of an individual spring-biased tooth or the total travel of two diametrically opposed spring-biased teeth is from about 0.6 to about 0.8 millimeter.

10. A hub as claimed in claim: 1, wherein at least two movable teeth are provided on a common support spring-biased against the ring member.

11. A magnetic tape cassette, especially a compact cassette, having at least one hub, for use with a tape transport apparatus having a drive spindle provided with projecting keys, said hub being displaceable in said cassette in at least the radial direction, and said hub comprising a ring member on whose inner periphery there are arranged teeth for driving engagement by said projecting keys on the drive spindle,
wherein said teeth include, in circumferentially spaced relationship, a plurality of immovable teeth which are radially spaced from the spindle, and also, in the same plane with said immovable teeth, at least one movable tooth which is spring-biased against the ring member to exert radial pressure on the drive spindle, so as to resiliently couple said hub to said spindle and thereby counteract abrupt displacements of the hub relatively to the cassette and hence reduce corresponding fluctuations in pitch during the operation of the cassette.

12. A magnetic tape cassette as claimed in claim 11 wherein said at least one spring-biased tooth has a spring rate of from about 1 P/mm to 40 P/mm.

* * * * *